United States Patent
Blinzer

(10) Patent No.: US 10,007,464 B1
(45) Date of Patent: Jun. 26, 2018

(54) METHOD AND APPARATUS FOR INTEGRATION OF NON-VOLATILE MEMORY

(71) Applicant: Advanced Micro Devices, Inc., Sunnyvale, CA (US)

(72) Inventor: Paul Blinzer, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 5 days.

(21) Appl. No.: 15/389,908

(22) Filed: Dec. 23, 2016

(51) Int. Cl.
*G06F 3/06* (2006.01)
*G06F 12/10* (2016.01)

(52) U.S. Cl.
CPC ............ *G06F 3/0647* (2013.01); *G06F 3/061* (2013.01); *G06F 3/0631* (2013.01); *G06F 3/0683* (2013.01); *G06F 12/10* (2013.01); *G06F 2212/65* (2013.01)

(58) Field of Classification Search
None
See application file for complete search history.

(56) References Cited

U.S. PATENT DOCUMENTS

| | | | | |
|---|---|---|---|---|
| 7,281,104 B1* | 10/2007 | Tsypliaev | ............. | G06F 3/0617 709/222 |
| 7,603,533 B1* | 10/2009 | Tsypliaev | ............. | G06F 21/575 709/217 |
| 7,953,948 B1* | 5/2011 | Dyatlov | ............. | G06F 11/1435 709/217 |

* cited by examiner

*Primary Examiner* — Kevin Verbrugge
(74) *Attorney, Agent, or Firm* — Volpe and Koenig, P.C.

(57) ABSTRACT

Described herein is a method and system for directly accessing and transferring data between a first memory architecture and a second memory architecture associated with a graphics processing unit (GPU) by treating the first memory architecture, the second memory architecture and system memory as a single physical memory, where the first memory architecture is a non-volatile memory (NVM) and the second memory architecture is a local memory. Upon accessing a virtual address (VA) range by a processor, the requested content is paged in from the single physical memory and is then redirected by a virtual storage driver to the second memory architecture or the system memory, depending on which of the GPU or CPU triggered the access request. The memory transfer occurs without awareness of the application and the operating system.

20 Claims, 6 Drawing Sheets

METHOD AND APPARATUS FOR INTEGRATION OF NON-VOLATILE MEMORY

CROSS-RELATED APPLICATIONS

This application is related to co-pending U.S. patent application Ser. No. 15/389,596 entitled "Method and Apparatus for Connecting Direct Access From Non-volatile Memory to Local Memory, filed on same date, and to co-pending U.S. patent application Ser. No. 15/389,747 entitled "Method and Apparatus for Connecting Non-volatile Memory locally to a GPU through a Local Switch", filed on same date, and to co-pending U.S. patent application Ser. No. 15/389,811 entitled "Method and Apparatus for Accessing Non-volatile Memory as Byte Addressable Memory", filed on same date, which are incorporated by reference as if fully set forth.

BACKGROUND

A graphics processing unit (GPU) may be nominally configured with a certain amount of local or dedicated memory, (hereinafter referred to as local), to service operations performed on the GPU. For example, the local memory may be dynamic random access memory. The GPU, which is a byte addressable device, may also have access to non-volatile memory (NVM), which is a type of block addressable memory. In the event that the GPU or certain applications require a transfer of data between the NVM and the local memory, an operating system (OS), display driver, device driver or similar hardware/software entity running on a host computing system typically controls or manages the data transfer process. This data transfer process entails a two hop process; first from the NVM to system memory, and then from the system memory to the local memory. In particular, the NVM data must be first transferred into the system memory via a NVM controller's block input/output (I/O) file transfer mechanism. The GPU can then access the data from the system memory. This involves at least using the system memory and results in increased traffic and congestion.

BRIEF DESCRIPTION OF THE DRAWINGS

A more detailed understanding may be had from the following description, given by way of example in conjunction with the accompanying drawings wherein.

DETAILED DESCRIPTION

Described herein is a method and system for directly accessing and transferring data between a first memory architecture and a second memory architecture associated with a graphics processing unit (GPU) or a discrete GPU (dGPU) by treating the first memory architecture and the second memory architecture as a part of physical memory, where the first memory architecture can be a non-volatile memory (NVM) or other similarly used memories, for example, along with associated controllers. The second memory architecture can be a device local memory e.g., a high bandwidth memory (HBM), a double data rate fourth-generation synchronous dynamic random-access memory (DDR4), a double data rate type five synchronous graphics random access memory (GDDR5), a hybrid memory cube or other similarly used memories, for example, along with associated controllers. For purposes of illustration and discussion, the terms NVM and local memory will be used in the description without limiting the scope of the specification and claims.

In particular, the system includes a physical memory that consists of the first memory architecture, the second memory architecture and system memory. In general, an application running on a central processing unit (CPU), graphics processing unit (GPU) or both can result in opening or accessing a file and allocating a virtual address (VA) range or space relative to the size of the file. The file is then mapped into the allocated VA range. In the event of an access, the VA range will be hit by the relevant load or store command from one of the CPU or GPU. Since the VA is not by default mapped physically to a portion of memory, the load or store command will generate a fault serviced by the operating system (OS) running on the CPU; the OS will catch the fault and page in the appropriate content from the first memory architecture, for example. The content is then redirected by a virtual storage driver to the second memory architecture or the system memory, depending on which of the GPU or CPU triggered the access request. Consequently, the memory transfer occurs without awareness of the application and the OS. This substantially simplifies the access to the first memory architecture from the GPU and the CPU perspective since the first memory architecture appears as regular low-latency memory though physically it is located in the "correct" memory, (i.e. the physical memory effectively includes the first memory architecture, the second memory architecture and system memory), for the access, (either system memory for the CPU or second memory architecture for the GPU). Collisions to the same VA range can be handled by the page fault servicing code by a coarse grain protocol, for example.

Figure 1:
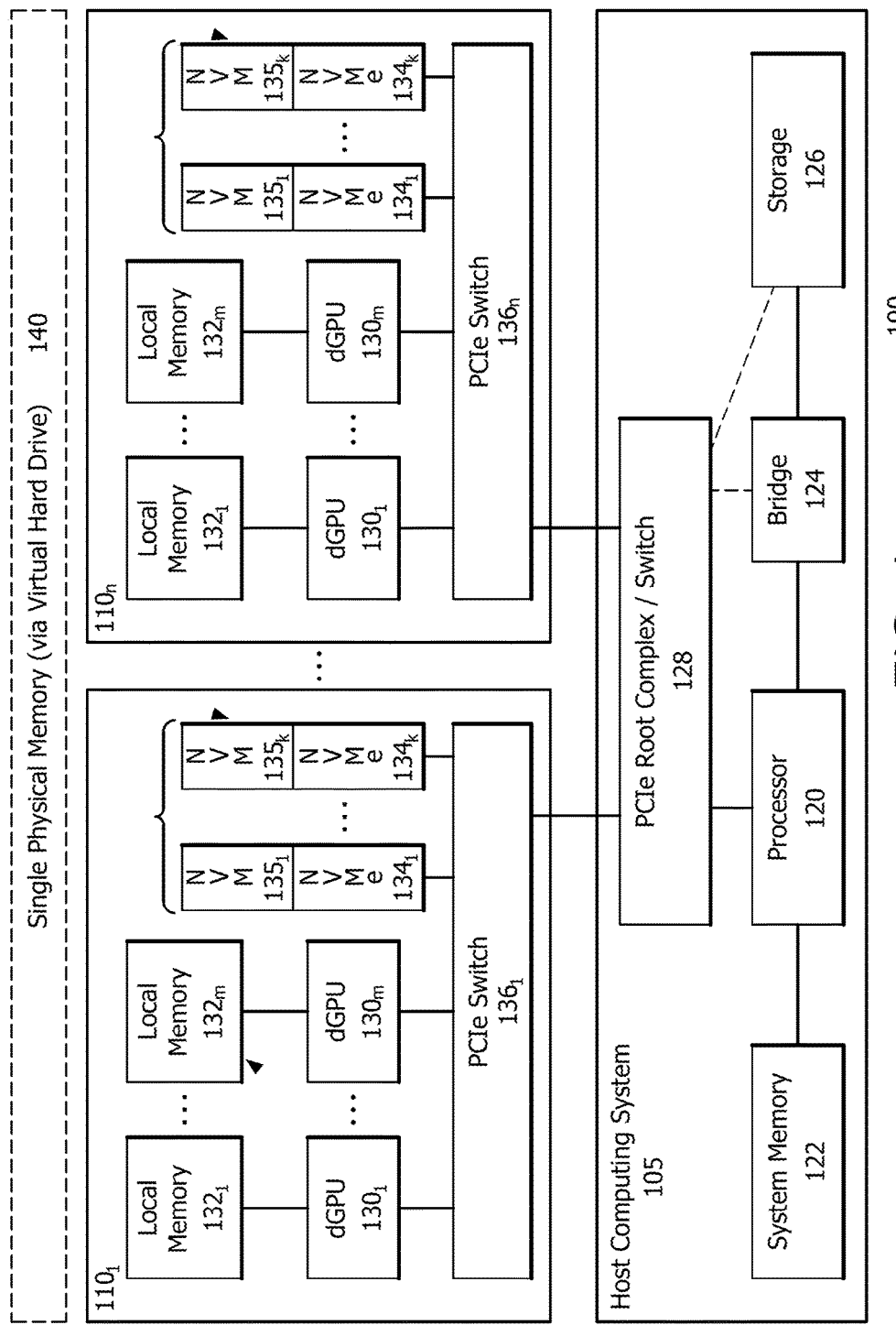
FIG. 1 illustrates a processing system with a host computing system and a solid state graphics (SSG) card in accordance with certain implementations.

FIG. 1 shows an example processing system 100 in accordance with certain implementations. The processing system 100 can include a host computing system 105 that is connected to one or more solid state graphics (SSG) boards or cards $110_1$ to $110_n$. The host computing system 105 includes a host processor 120, such as for example a central processing unit (CPU), which may be connected to, or in communication with, a system memory 122 such as for example random access memory (RAM). The host processor 120 can also be connected to, or in communication with, a number of components, including but not limited to, a bridge 124 and storage 126. The components shown are illustrative and other components may also be connected to or be in communication with the CPU 105. The components may be connected to or be in communication with the host processor 120 using, for example, a high-speed serial computer expansion bus, such as but not limited to, a Peripheral Component Interconnect Express (PCIe) root complex and switch (collectively PCIe switch) 128. The PCIe switch 128 is shown for purposes of illustration and other electrical or communication interfaces may be used.

Figure 1A:
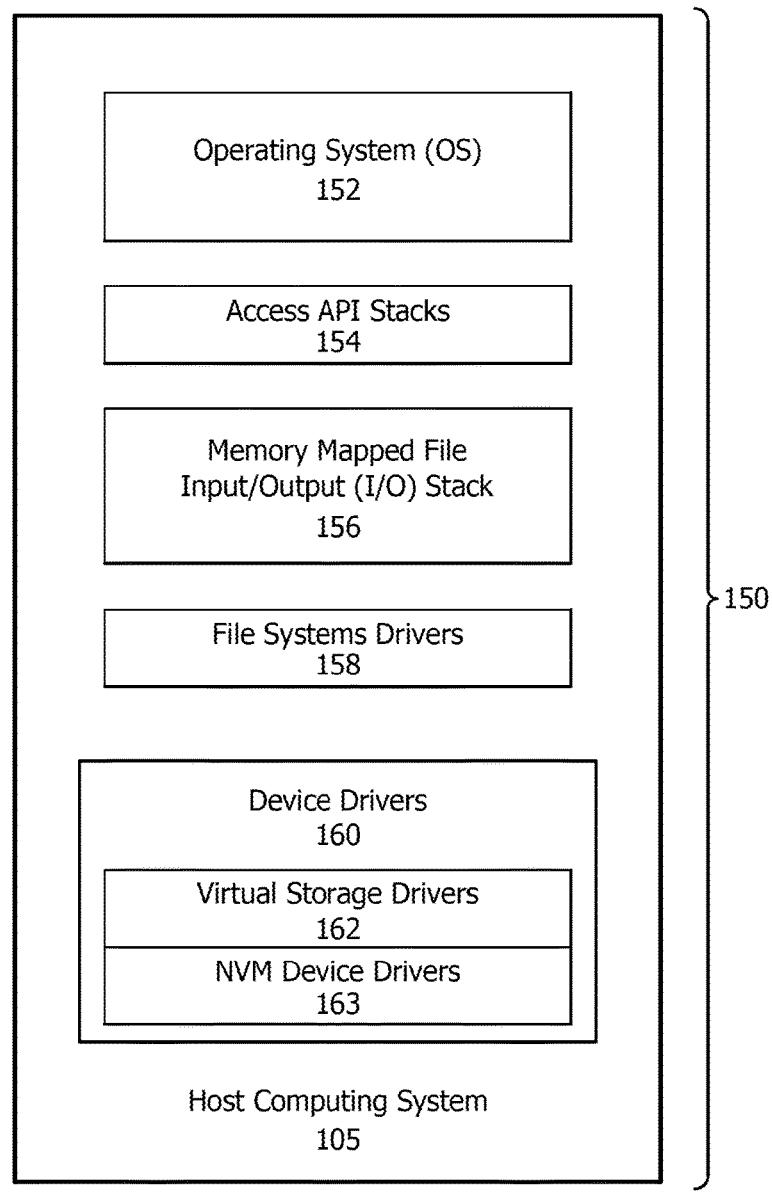
FIG. 1A illustrates a software stack for the processing system of FIG. 1 in accordance with certain implementations.

Referring now to FIG. 1A, a software stack 150 runs on host computing system 105, where the software stack 150 includes, but is not limited to, an operating system (OS) 152, access application program interface (APIs) stacks 154 for accessing memory and file systems, memory mapped file input/output (I/O) stack 156 for mapping file systems and raw disk content, file system drivers 158, memory management for controlling and configuring file systems, formatting volumes, and performing other similar functions, device drivers 160 for accessing memory and other nominal elements. In an implementation, device drivers 160 can include a virtual storage driver 162, which uses a storage driver protocol abstraction that enables GPU direct memory access (DMA) processing in the background for data transfer and which requires no strict association with a particular hardware type. In an implementation, device drivers 160 can include NVM device drivers 163, which can be used for accessing NVMs.

In an implementation, memory mapped file I/O stack 156 maps storage file or raw disk content into application VA range. In a general example, a VA range allocation is created for a process/application by OS 152, which commits system memory 122 as access cache. On access by host processor 120, for example, to a VA range within the file mapping, OS 152 pages in appropriate sections into system memory 122 from storage based on relative location. On write to the system memory 122, OS 152 updates the access cache and eventually flushes content to backend storage as needed. In this instance, backend storage refers to a large storage device that receives the data when the data is not in use. In general, backend storage is used in demand paging scenarios where the data currently in process is loaded into HBM RAM, for example, and data that has been updated and does not need to be processed any further is written back to the storage device, (e.g. a non-volatile memory (NVM) Express (NVMe) as described herein below). OS 152 efficiently manages the data through a file system and communication with other components of the storage stack like storage interface drivers (RAIDx drivers, SATA, NVMe drivers, etc) and system memory commit and un-commit commands. In an implementation, a GPU with shared virtual memory (SVM) can access the same virtual address mappings as host processor 120.

Referring back to FIG. 1, each SSG board $110_1$ to $110_n$ includes a PCIe switch $136_1$ to $136_n$ for interfacing with PCIe switch 128. Each PCIe switch $136_1$ to $136_n$ can be connected to or be in communication with, (collectively "connected to"), one or more non-volatile memory (NVM) controllers $134_1$ to $134_k$, such as for example, a NVM Express (NVMe) or Non-Volatile Memory Host Controller Interface Specification (NVMHCI) device, for accessing associated NVMs $135_1$ to $135_k$ and can also be connected to one or more dGPUs $130_1$ to $130_m$. Each dGPU $130_1$ to $130_m$ is further connected to an associated device local memory $132_1$ to $132_m$. Each NVM controller $134_1$ to $134_k$ can manage and access an associated NVM $135_1$ to $135_k$ and in particular, can decode incoming commands from host computing system 105 or dGPU $130_1$ to $130_m$. The system and SSG board described herein are illustrative and other configurations can be used without departing from the scope of the description and claims. Further configurations are described in co-pending application Ser. No. 15/389,747 entitled "Method and Apparatus for Connecting Non-volatile Memory locally to a GPU through a Local Switch, which is incorporated by reference as if fully set forth.

In an implementation, a SSG board $110_1$ to $110_n$ can implement a redundant array of independent disks (RAID) architecture to provide parallelized or distributed access to each NVM controller $134_1$ to $134_k$ and NVM $135_1$ to $135_k$ as described in co-pending application entitled "Method and Apparatus for Connecting Non-volatile Memory locally to a GPU through a Local Switch", filed on same date, which is incorporated by reference as if fully set forth. For example, in a SSG board $110_1$ to $110_n$, a NVM controller $134_1$ to $134_k$ and NVM $135_1$ to $135_k$ can be configured for 4 kB access stripes for a total of 16 kB block default view. In an implementation, a bank selection register can be used for higher address selection on NVM $135_1$ to $135_k$.

In an implementation, a NVM controller $134_1$ to $134_k$ and NVM $135_1$ to $135_k$ can be accessed by a dGPU $130_1$ to $130_m$ via DMA commands. In an implementation, efficient processor 120 and/or peer-to-peer (P2P) access can be implemented using appropriately size or resizable base address register (BAR) apertures in an appropriate PCIe switch $136_1$ to $136_n$ to access, for example, a NVM controller $134_1$ to $134_k$ and NVM $135_1$ to $135_k$. This allows processor 120 mapping of memory for efficient, large data block transfers from processor 120, and P2P devices via remote DMA. Virtual storage driver 162 can then map data to appropriate block in NVM controller $134_1$ to $134_k$ and NVM $135_1$ to $135_k$ via a migration or mirroring scheme as described herein. In an implementation, streaming and block access modes can be implemented.

In an implementation, a dGPU $130_1$ to $130_m$ can have a physical address bit that selects SSG board internal address space or board external address space and can be used to identify dGPU or host computing based access. In an implementation, command queues, and jump buffers in frame buffer memory can be accessible to each NVM controller $134_1$ to $134_k$ and NVM $135_1$ to $135_k$. In an implementation, dGPU $130_k$ to $130_m$ virtual address mapping allows linear mapping of content into shaded or application virtual address space, with virtual storage driver 162 mapping physical content as described herein.

In an implementation, system memory 122, each of NVMs $135_1$ to $135_k$, and each of local memories $132_1$ to $132_m$ is treated as a single physical memory using, for example, a file format such as virtual hard disk (VHD). In an implementation, files and/or data can span multiple SSG boards $110_1$ to $110_n$. As described herein, this single physical memory in combination with a virtual memory infrastructure provided by the memory mapped file I/O stack 156, enables virtual storage driver 162 to redirect content based on whether host processor 120 or one of dGPU $130_1$ to $130_m$ sent the access request or data transfer command. That is, virtual storage driver 162 provides input/output (I/O) for processing system 100. In particular, memory mapped file I/O stack 156 allows raw disc access, or file system mapping as needed, where OS 152 updates NVMs $135_1$ to $135_k$ content, and creates a virtual address file view. Moreover, memory mapped file I/O stack 153 allows RAID setup management by OS 152 and use of NVM device drivers 163.

Figure 2:
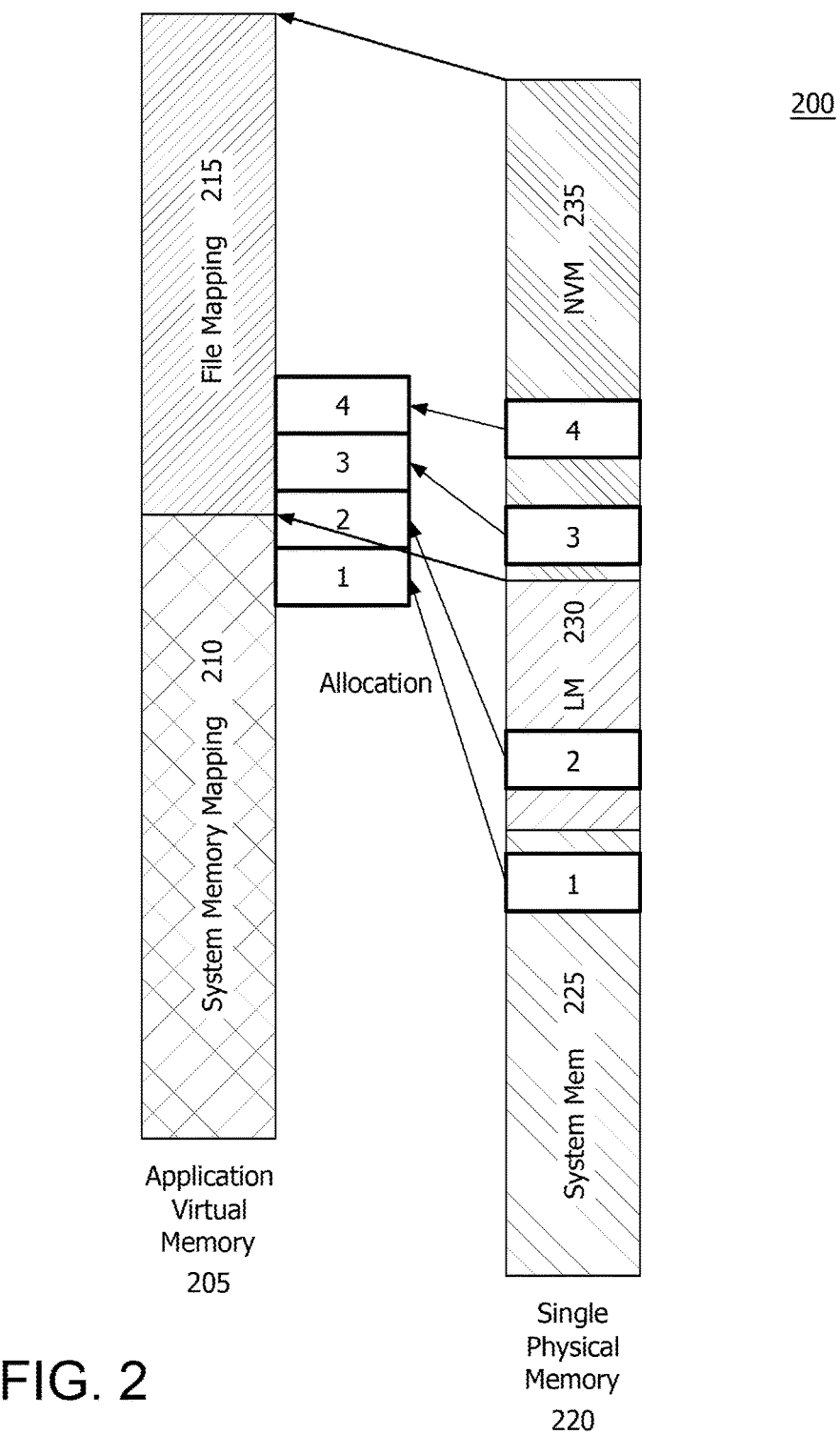
FIG. 2 illustrates a memory mapping using the processing system of FIG. 1 in accordance with certain implementations.

FIG. 2 illustrates a memory mapping 200 using the processing system of FIG. 1 in accordance with certain implementations. As noted herein, an application VA 205 (or application virtual memory) is created and allocated for an application or process. In an example, application VA 205 includes a system memory mapping 210 and a file mapping 215. Upon an access request, content is paged in from single physical memory 220, where single physical memory 220 includes system memory 225, local memory (LM) 230 and NVM 235. For example, content for page 1 is from system memory 225, content for page 2 is from local memory 230 and content from pages 3 and 4 are from NVM 235. As illustrated, an application still sees one (large) virtual address space for data with both GPU and CPU code.

Referencing now also to FIG. 1, virtual storage driver 162 permits the GPU to abstract single physical memory 220 appropriately. In particular, GPU local memory 230 is referenced via virtual addresses and, as noted herein, a memory mirroring scheme or a redirection scheme can be used to accomplish same. In the memory mirroring scheme implementation, the data is duplicated and redirected to local memory 230 in addition to system memory 225. Both the GPU and CPU have access to their own content with fast system memory or local memory updates, respectively, using a coarse grain access protocol to flush updated content to the other memory, which is coordinated via virtual storage driver 162. This scheme can benefit multi-GPU processing where system memory 225 contains global mapping and GPUs contain their local version of the data, and allows scaling of the scheme to enormously huge files (>2 TByte) with additional SSG cards in the system containing a portion of the data.

In the redirection scheme, the content is redirected to local memory 230 by the virtual storage driver 162 instead of the data being direct memory accessed (DMA'd) by NVM device 235 or storage drivers to system memory 225. This scheme supports multiple GPU P2Ps provided that the framebuffer aperture is large enough in the PCIe switch, (i.e. PCIe switch $136_1$-$136_n$ and PCIe switch 128).

In general and with respect to both schemes described above, PCIe switches implement apertures to provide access to PCIe devices. Accordingly, device local memory 132 (or local memory 230) can be mapped into system memory 122 (or system memory 225) via a "host access-GPU" aperture in PCIe switch 128. Therefore the DMA access is redirected to that aperture to transfer the data into device local memory 132 (or local memory 230).

Figure 3:
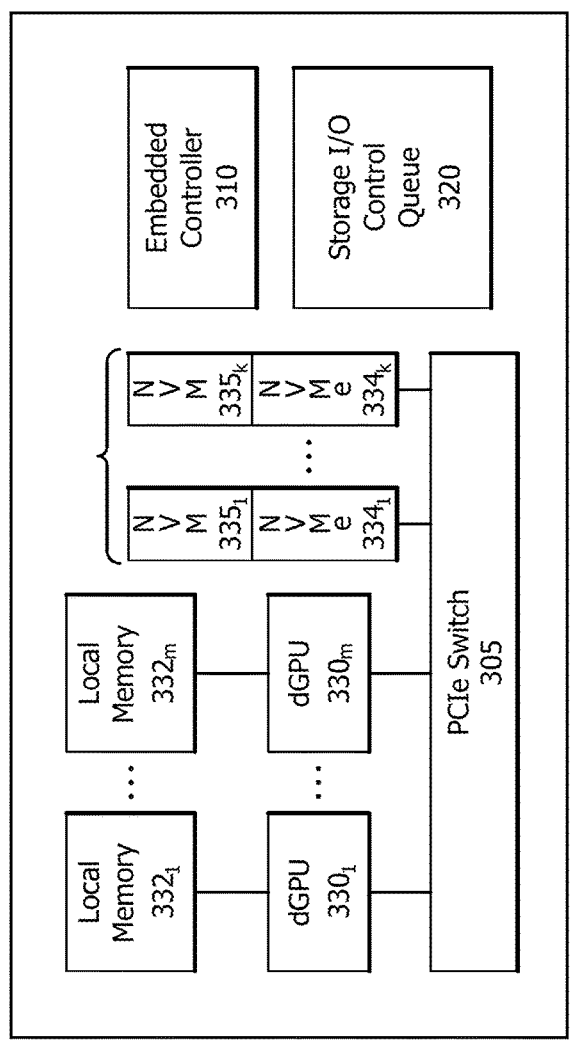
FIG. 3 illustrates a solid state graphics (SSG) card in accordance with certain implementations.

FIG. 3 a solid state graphics (SSG) board or card 300 which can be used in processing system 100 in accordance with certain implementations. SSG board 300 includes a PCIe switch 305 for interfacing with a PCIe switch on a host computing system 105, for example. PCIe switch 305 is further connected to one or more NVM controllers $334_1$ to $334_k$, such as for example, a NVMe or NVMHCI device, for accessing associated NVMs $335_1$ to $335_k$ and can also be connected to one or more dGPUs $330_1$ to $330_m$. Each dGPU $330_1$ to $330_m$ is further connected to an associated device local memory $332_1$ to $332_m$ Each NVM controller $334_1$ to $334_k$ can manage and access an associated NVM $335_1$ to $335_k$ and in particular, can decode incoming commands from host computing system 105 or dGPU $330_k$ to $330_m$.

SSG board 300 further includes an embedded controller 310 that offloads certain functions from NVM controllers $334_1$ to $334_k$. For example, embedded controller 310 can perform storage management for NVMs $335_1$ to $335_k$, RAID array management, file system management and DMA transfer operations. In particular, by having a high-level file system defined in embedded controller 310, embedded controller 310 can manage multiple resources, can size memory/storage to map with GPU resources, can look like network storage from a host system and can access raw files without regard to file system reference, (i.e. embedded controller 310 can simply use a handle). In this implementation, embedded controller 310 performs as a frontend for host computing system 105, for example, that follows the Heterogeneous System Architecture (HSA) accelerator dispatch model.

Embedded controller 310 enables offloading high-throughput work from the host CPUs and enables dGPU $330_1$ to $330_m$ to dispatch requests to NVM $335_1$ to $335_k$ at a file system level, with embedded controller 310 managing the file system. In particular, embedded controller 310 can run NVMs $335_1$ to $335_k$ as raw RAID storage array on SSG board 300 and provide a single linear addressed storage array view to other components. In an implementation, embedded controller 310 can be implemented or emulated on a dedicated host CPU thread or offloaded to a dedicated embedded system or CPU, (e.g. a field-programmable gate array (FPGA)), without a change to the application visible functionality. Offloading can improve performance and system throughput.

SSG board 300 further includes a storage input/output (I/O) control queue 320, (i.e. an I/O ring), which acts as a programming interface. Storage I/O control queue 320 can be written by a host via Gfx kernel mode driver (KMD) as a Windows Display Driver Model (WDDM) ring as a special engine, host storage driver (i.e. virtual storage miniport), or directly by a GPU kernel. In an implementation, storage I/O control queue 320 can use a lock-free dispatch mechanism similar to an Architected Queuing Language (AQL) queue as used in HSA accelerator dispatch model. In particular, storage I/O control queue 320 can use signals to mark completion as fences and other events to other clients like host, local & peer GPU. For example, storage I/O control queue 320 can use a memory fence or barrier, where the barrier instruction can be an atomic read-modify-write or an atomic store-write instruction to a physical memory location, (which can be referenced through a virtual address mapping provided a software stack 150, for example). The change of state of the physical memory location, (being used for the memory fence), can be directly observed by other accelerators like dGPU $330_1$ to $330_m$ or by a host processor directly, and allows dGPU $330_1$ to $330_m$ or the host processor, for example, to start the next series of processing steps immediately after the physical memory location changed state instead of waiting for an interrupt service routine, (which can delay processing and cause latency). In this instance, storage I/O control queue 320 would not require host queue arbitration to access the particular content or data.

Storage I/O control queue 320 works with embedded controller 310. In particular, embedded controller 310 can provide queue language with packet commands for storage I/O control queue 320 operability. The queue language with packet commands can be used to implement or provide a variety of functions. In an implementation, the packet commands can be issued by GPU kernels, host processing system or via service drivers as remote storage. That is, the packet commands can be processed like file access routines similar to higher-level file I/O, which allows software on the host processing system or GPU to access the data logistically in a way similar to how a computer user accesses a remote network file on a network or cloud storage. This means that the software doesn't need to deal with the intricacies of the data storage but can focus on implementing an efficient processing algorithm.

In an implementation, the packet commands can be used to create/allocate and release storage space on NVMs $335_1$ to $335_k$, for example. In an implementation, the packet commands can be used to issue reads and writes referenced via handles to storage spaces/files. In an implementation, the packet commands can be processed by a small, dedicated embedded OS and runtime, (dealing with the physical layout of the data on the storage devices or NVM, e.g. as linear volume or in a RAID configuration), without changing the host processing system or GPU software if a different implementation materially changes the storage type or physical data layout.

Figure 4:
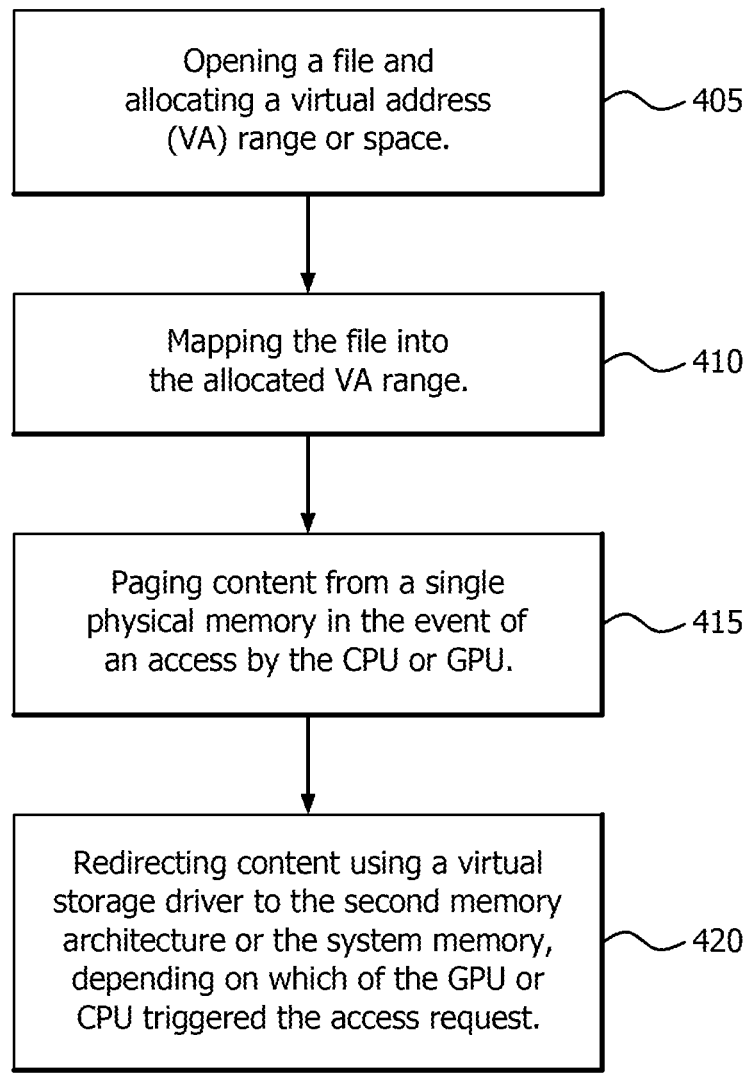
FIG. 4 is a flow diagram using the processing system of FIGS. 1 and 4 in accordance with certain implementations.

FIG. 4, in concert with FIGS. 1, 1A, 2, and 3 shows an example flowchart 400 for transferring data in accordance with certain implementations. An application running on a central processing unit (CPU), graphics processing unit (GPU) or both results in opening or accessing a file and allocating a virtual address (VA) range or space relative to the size of the file (step 405). The file is then mapped into the allocated VA range (step 410). Content is paged in from a single physical memory in the event of an access by the CPU or GPU (step 415), where the single physical memory includes a first memory architecture, a second memory architecture and system memory. The content is redirected by a virtual storage driver to the second memory architecture or the system memory, depending on which of the GPU or CPU triggered the access request (step 420).

Figure 5:
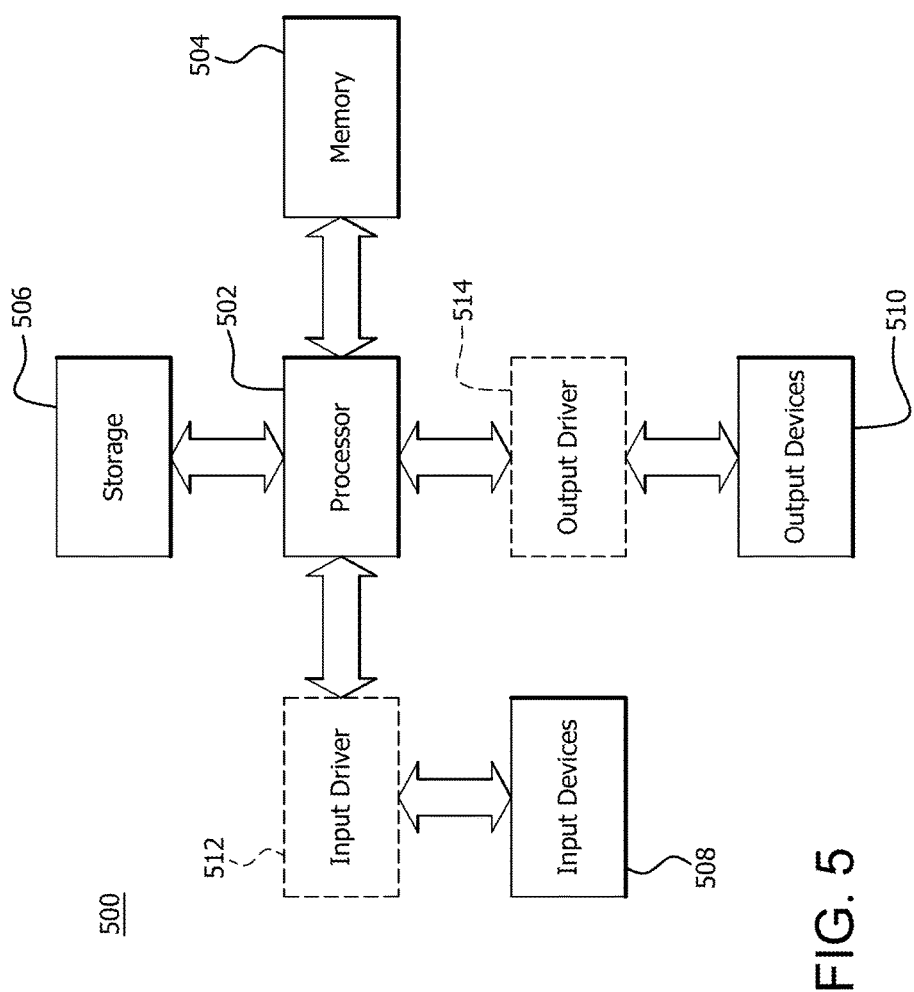
FIG. 5 is a block diagram of an example device in which one or more disclosed implementations may be implemented.

FIG. 5 is a block diagram of an example device 500 in which one portion of one or more disclosed implementations may be implemented. The device 500 may include, for example, a head mounted device, a server, a computer, a gaming device, a handheld device, a set-top box, a television, a mobile phone, or a tablet computer. The device 500 includes a processor 502, a memory 504, a storage 506, one or more input devices 508, and one or more output devices 510. The device 500 may also optionally include an input driver 512 and an output driver 514. It is understood that the device 500 may include additional components not shown in FIG. 5.

The processor 502 may include a central processing unit (CPU), a graphics processing unit (GPU), a CPU and GPU located on the same die, or one or more processor cores, wherein each processor core may be a CPU or a GPU. The memory 504 may be located on the same die as the processor 502, or may be located separately from the processor 502. The memory 504 may include a volatile or non-volatile memory, for example, random access memory (RAM), dynamic RAM, or a cache.

The storage 506 may include a fixed or removable storage, for example, a hard disk drive, a solid state drive, an optical disk, or a flash drive. The input devices 508 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 may include a display, a speaker, a printer, a haptic feedback device, one or more lights, an antenna, or a network connection (e.g., a wireless local area network card for transmission and/or reception of wireless IEEE 802 signals).

The input driver 512 communicates with the processor 502 and the input devices 508, and permits the processor 502 to receive input from the input devices 508. The output driver 514 communicates with the processor 502 and the output devices 510, and permits the processor 502 to send output to the output devices 510. It is noted that the input driver 512 and the output driver 514 are optional components, and that the device 500 will operate in the same manner if the input driver 512 and the output driver 514 are not present.

In general and without limiting implementations described herein, a computer readable non-transitory medium including instructions which when executed in a processing system cause the processing system to execute a method for accessing non-volatile memory as byte addressable memory.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for transferring content, the method comprising:
    accessing a file in response to an application running on a processor, wherein the processor is one of a graphics processing unit (GPU) and a central processing unit (CPU);
    allocating a virtual address (VA) range for the file;
    mapping the file into the allocated VA range;
    paging content from a first location in a single physical memory when an access request by one of the GPU and the CPU to the file results in a fault, wherein the single physical memory includes at least a first memory architecture, a second memory architecture and system memory; and
    redirecting the paged content using a virtual storage driver to a second location in the single physical memory depending on which of the GPU or CPU triggered the access request.

2. The method of claim 1, wherein the first memory architecture is non-volatile memory (NVM).

3. The method of claim 1, wherein the second memory architecture is memory local to the GPU.

4. The method of claim 3, wherein the second memory architecture is at least one of a high bandwidth memory (HBM), a double data rate fourth-generation synchronous dynamic random-access memory (DDR4), a double data rate type five synchronous graphics random access memory (GDDR5), a hybrid memory cube.

5. The method of claim 1, wherein the first location is one of the first memory architecture, second memory architecture and system memory and the second location is another one of the first memory architecture, second memory architecture and system memory.

6. The method of claim 1, wherein an address bit is used to designate whether the access request is from the GPU or CPU.

7. The method of claim 1, wherein the single physical memory uses a virtual hard disk file format.

8. The method of claim 1, wherein the first memory architecture includes NVM located on a plurality of solid state graphics (SSG) boards.

9. The method of claim 1, wherein the virtual storage driver uses memory mirroring to store the content at both the second architecture and the system memory.

10. A system for transferring content, comprising:
a host processing system including at least one processor and system memory;
at least one solid state graphics (SSG) board connected to the host processing system via a switch, wherein each SSG board includes at least one first memory architecture device connected via a local switch to at least one graphics processing unit (GPU), each GPU connected to a second memory architecture device,
a single physical memory including each first memory architecture device, each second memory architecture device and the system memory; and
a virtual storage driver in communication with the host processing system and each of the SSG boards,
wherein content is paged from a first location in the single physical memory when an access request by one of the at least one GPU and the at least one processor to a file in a virtual address range results in a fault; and
wherein the virtual storage driver redirects the paged content to a second location in the single physical memory depending on which of the at least one GPU and the at least one processor triggered the access request.

11. The system of claim 10, wherein the first memory architecture is non-volatile memory (NVM).

12. The system of claim 10, wherein the second memory architecture is memory local to the GPU.

13. The system of claim 12, wherein the second memory architecture is at least one of a high bandwidth memory (HBM), a double data rate fourth-generation synchronous dynamic random-access memory (DDR4), a double data rate type five synchronous graphics random access memory (GDDR5), a hybrid memory cube.

14. The system of claim 10, wherein the first location is one of the first memory architecture, second memory architecture and system memory and the second location is another one of the first memory architecture, second memory architecture and system memory.

15. The system of claim 10, wherein an address bit is used to designate whether the access request is from the at least one GPU and the at least one processor.

16. The system of claim 10, wherein the single physical memory uses a virtual hard disk file format.

17. The system of claim 10, wherein the virtual storage driver uses memory mirroring to store the content at both the second architecture and the system memory.

18. A non-transitory computer readable medium including instructions which when executed in a processing system cause the processing system to execute a method for transferring content, the method comprising the steps of:
accessing a file in response to an application running on a processor, wherein the processor is one of a graphics processing unit (GPU) and a central processing unit (CPU);
allocating a virtual address (VA) range for the file;
mapping the file into the allocated VA range;
paging content from a first location in a single physical memory when an access request by one of the GPU and the CPU to the file results in a fault, wherein the single physical memory includes at least a first memory architecture, a second memory architecture and system memory; and
redirecting the paged content using a virtual storage driver to a second location in the single physical memory depending on which of the GPU or CPU triggered the access request.

19. The non-transitory computer readable medium of claim 18, wherein the first location is one of the first memory architecture, second memory architecture and system memory and the second location is another one of the first memory architecture, second memory architecture and system memory.

20. The non-transitory computer readable medium of claim 18, wherein the first memory architecture is non-volatile memory (NVM) and the second memory architecture is memory local to the GPU.

* * * * *